S. E. PRICE.
FRUIT PICKER.
APPLICATION FILED JUNE 12, 1911.

1,045,322.

Patented Nov. 26, 1912.

Witnesses

Inventor
Scott E. Price
By Joshua R. H. Potts
Attorney

UNITED STATES PATENT OFFICE.

SCOTT E. PRICE, OF LOGANSPORT, INDIANA.

FRUIT-PICKER.

1,045,322. Specification of Letters Patent. Patented Nov. 26, 1912.

Application filed June 12, 1911. Serial No. 632,560.

*To all whom it may concern:*

Be it known that I, SCOTT E. PRICE, a citizen of the United States, residing at Logansport, county of Cass, and State of Indiana, have invented certain new and useful Improvements in Fruit-Pickers, of which the following is a specification.

My invention relates to fruit pickers, that is, to devices by means of which fruit may be plucked and gathered from the trees without injury to the fruit.

The object of my invention is to provide a device of the class mentioned which shall be of simple construction and which may be readily operated to quickly gather the fruit without injury to the same.

A further object of my invention is to provide a device as mentioned which may be adjusted to reach fruit at different heights on the trees.

Other objects will appear hereinafter.

With these objects in view my invention consists generally in a fruit picker comprising a stem or handle, a globular head on the stem cut away on one side forming a fruit receiving opening, a stationary knife at the upper edge of said opening, a bowed hingedly mounted knife on the head adapted to traverse the opening to coöperate with said stationary knife to sever the stems of the fruit and means for operating the hingedly mounted knife.

My invention further consists in a device as mentioned equipped with a piece of fabric or other suitable flexible material secured at its edges to the lower edge of the opening in the head and to the lower edge of the hinged knife respectively, whereby said head is completely closed when the knives are brought into coöperation.

My invention further consists in a fruit picker as above mentioned in which the stem or handle is tubular and jointed whereby, when small fruit is picked, the fruit will pass downwardly through the stem into a suitable receptacle at the lower end.

My invention further consists in various details of construction and arrangements of parts all as will be fully described hereinafter and particularly pointed out in the claim.

My invention will be more readily understood by reference to the accompanying drawings forming a part of this specification and in which—

Figure 1:
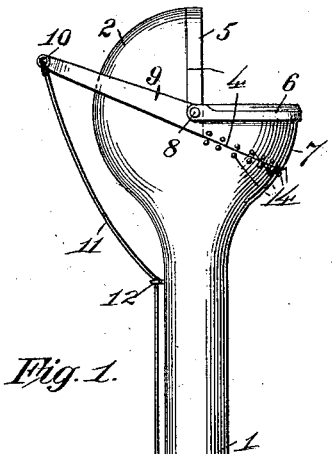
Figure 2:
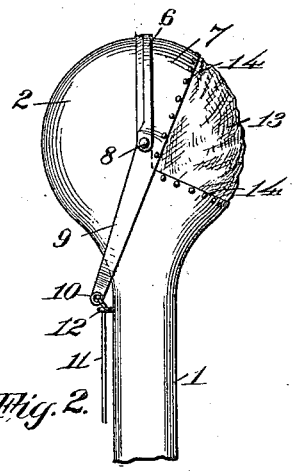
Figure 3:
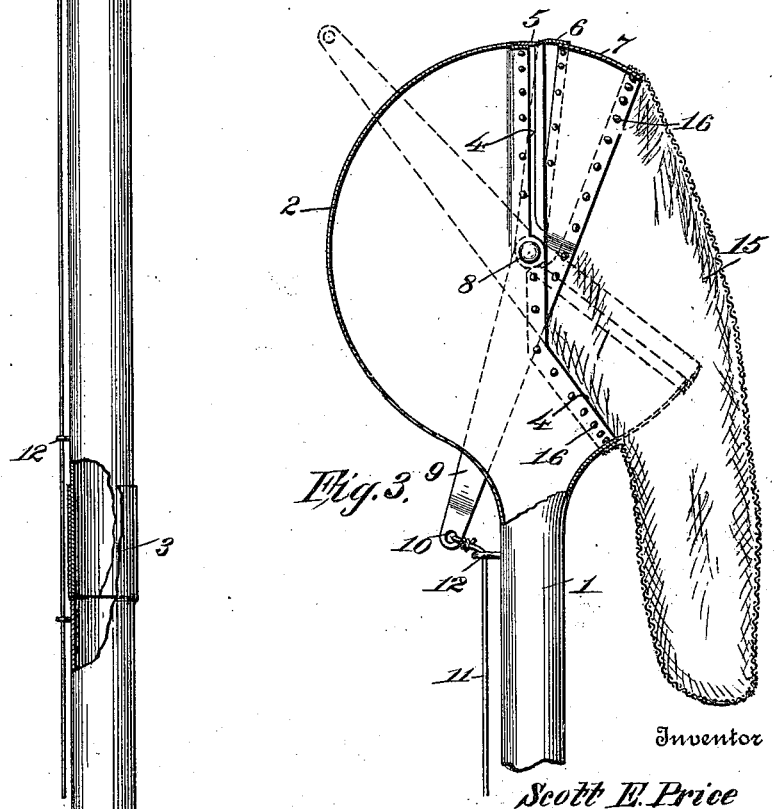

Figure 1 is a side elevation of a fruit picker embodying my invention in its preferred form, and illustrating the same in open position, Fig. 2 is a similar view of the upper portion or head thereof illustrating the same in closed position, and Fig. 3 is a section through the head of a picker such as used in gathering large fruit such as apples and pears, and illustrating the same in closed position.

Referring now to the drawings 1 indicates the stem or handle of the device and 2 the head. The stem is made of several sections, the ends of which are detachably connected as at 3 in order that the length of the device may be made to correspond with the height of the fruit being picked. I prefer the stem to be tubular as illustrated in the drawings and this is particularly desirable in the smaller sizes used for picking small fruit such as cherries, as the fruit may then pass downwardly through the stem to any suitable receptacle provided at the lower end.

The head 2 is preferably globular or spherical and is cut away upon one side as at 4 forming a large fruit receiving opening. The opening extends almost to the horizontal axis of the spherical head and the upper edge thereof is provided with a semi-circular knife 5, the ends of which extend to the ends of said axis. Hingedly connected to the head 2, and preferably to the ends of the knife 5 is a second knife 6 which is bow shaped or semi-circular and adapted to traverse the opening in the head and coöperate with the knife 5 to cut the stems of the fruit. The knife 6 is preferably attached to or carried by a member 7 hingedly connected to the head as at 8 which is the hinge point of the knife. The member 7 is substantially a luniform section of the spherical head and is provided with oppositely extending arms 9 which converge at a point beyond the head in an eye 10. The knife 6 is fixed to the upper edge of the member 7 and the lower edge of said member preferably rests upon the lower edge of the wall defining the opening when the device is in open position. 11 indicates a flexible member or cord secured in the eye 10 and passing downwardly through eyes 12 on the stem 1. By pulling on the cord 11 the knife 6 is caused to traverse the opening and engage with the knife 5.

A piece of fabric is provided for closing the space between the lower edge of the member 7 and the lower edge of the opening when the knives are brought into co-operation in the smaller sized devices used for picking small fruit, a small piece of fabric 13 is employed having its edges secured as at 14 to the lower edge of the member 7 and at the lower edge of the opening respectively. In the larger sized devices for picking large fruit which will not readily pass through the stem the fabric bag or sack 15 is provided, the mouth of the sack being secured to the edge of the member 7 and at the lower edge of the opening as at 16.

The device may be manufactured of any sheet metal with the exception of the knives which are formed of steel.

The operation of the device is obvious from the drawings and the above description and need not be set forth in detail.

Having described my invention what I claim as new and desire to secure by Letters Patent is:—

A fruit picker comprising a stem, a hollow globular head provided with an opening, a luniform member hingedly mounted on said head, an arm on said member, co-acting knives fixed to said head and to said member respectively, a piece of fabric having its edges secured to the lower edge of said luniform member and to the upper edge defining the lower end of said opening, said fabric forming a bag extending below said head when said knives are in approximate contact, and a flexible cord secured to the end of said arm and extending down said stem, substantially as described.

In testimony whereof I have signed my name to this specification in the presence of two subscribing witnesses.

SCOTT E. PRICE.

Witnesses:
MAURICE WINFIELD,
GEO. A. CUSTER.